(12) United States Patent
Kim (10) Patent No.: US 8,623,535 B2
(45) Date of Patent: Jan. 7, 2014

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 181 days.

(21) Appl. No.: 13/110,658

(22) Filed: May 18, 2011

(65) Prior Publication Data

US 2012/0208069 A1     Aug. 16, 2012

(30) Foreign Application Priority Data

Feb. 15, 2011     (KR) ........................ 10-2011-0013340

(51) Int. Cl.
*H01M 2/10*     (2006.01)
(52) U.S. Cl.
USPC ........... 429/100; 429/138; 429/149; 429/151; 429/153; 429/163; 429/172; 429/186
(58) Field of Classification Search
USPC ........... 429/99, 100, 138, 149, 151–153, 163, 429/172, 186
See application file for complete search history.

(56) References Cited

U.S. PATENT DOCUMENTS

| 4,994,940 A | 2/1991 | Thouvenin et al. | |
|---|---|---|---|
| 2003/0013009 A1* | 1/2003 | Dansui et al. | 429/120 |
| 2005/0058891 A1* | 3/2005 | Marraffa | 429/99 |
| 2009/0092876 A1 | 4/2009 | Yasui et al. | |
| 2010/0136461 A1 | 6/2010 | Tsujiko et al. | |
| 2010/0255363 A1 | 10/2010 | Yoon et al. | |

FOREIGN PATENT DOCUMENTS

| EP | 0 952 620 B1 | 10/1999 |
|---|---|---|
| EP | 2 390 945 A1 | 11/2001 |
| EP | 2 323 194 A1 | 5/2011 |
| EP | 2 325 922 A1 | 5/2011 |
| EP | 2 325 923 A1 | 5/2011 |
| EP | 2 328 201 A1 | 6/2011 |
| EP | 2 330 657 A1 | 6/2011 |
| EP | 2 337 113 A1 | 6/2011 |
| EP | 2 339 664 A1 | 6/2011 |
| EP | 2 341 569 A1 | 7/2011 |
| EP | 2 381 506 A1 | 10/2011 |
| EP | 2 381 507 A1 | 10/2011 |
| JP | 2002-343324 | 11/2002 |

(Continued)

OTHER PUBLICATIONS

Office action dated Nov. 15, 2011 of the European Patent Application No. 11172431.6, which claims priority of the corresponding Korean priority application No. 10-2011-0013340, 6 pages.

(Continued)

*Primary Examiner* — Patrick Ryan
*Assistant Examiner* — Ben Lewis
(74) *Attorney, Agent, or Firm* — Christie, Parker & Hale, LLP (57) ABSTRACT

A battery module includes a plurality of battery cells stacked together; first and second end plates located at a first end and a second end, respectively, of the stacked battery cells; and side plates and a bottom plate coupled to the first and second end plates, wherein at least one of the first end plate and the second end plate has a bent support portion that overlaps with at least a portion of the bottom plate.

13 Claims, 7 Drawing Sheets

(56) References Cited

FOREIGN PATENT DOCUMENTS

| KR | 1998-056884 | 9/1998 |
| KR | 10-2007-0081584 | 8/2007 |
| KR | 10-2007-0116683 A | 12/2007 |
| KR | 10-2009-0000307 A | 1/2009 |
| KR | 10-2009-0130328 | 12/2009 |
| WO | WO 2010/123091 A1 | 10/2010 |

OTHER PUBLICATIONS

KIPO Office action dated Jul. 20, 2012, for Korean priority Patent application 10-2011-0013340, (5 pages).

EPO Office action dated Jan. 28, 2013, for corresponding European Patent application 11172431.6, (6 pages).

* cited by examiner

BATTERY MODULE

CROSS-REFERENCE TO RELATED APPLICATION

This application claims priority to and the benefit of Korean Patent Application No. 10-2011-0013340, filed on Feb. 15, 2011, in the Korean Intellectual Property Office, the entire content of which is incorporated herein by reference.

BACKGROUND

1. Field

Embodiments of the present invention relate to a battery module.

2. Description of Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

A battery cell typically includes an electrolyte and an electrode assembly composed of a positive plate and a negative electrode plate, and generates energy through an electrochemical reaction of these electrode plates and the electrolyte. Gas may be generated as a side reaction of the electrochemical reaction in the interior of the battery cell, and the generated gas may change the external shape of the battery cell. Further, the change in the external shape of the battery cell has influence on the shape of a battery module formed by aligning a plurality of battery cells, and therefore, the battery cells may not be firmly fixed in the battery module. Accordingly, various types of battery modules have been developed to minimize a change in the external shape of battery cells and to enhance productivity of the battery modules.

SUMMARY

Embodiments provide a battery module capable of improving reliability by strengthening a housing of the battery module. Embodiments also provide a battery module capable of minimizing the size and weight of the battery module by distributing the load of a plurality of battery cells.

A battery module including a plurality of battery cells stacked together; first and second end plates located at a first end and a second end, respectively, of the stacked battery cells; and side plates and a bottom plate coupled to the first and second end plates, wherein at least one of the first end plate and the second end plate has a bent support portion that overlaps with at least a portion of the bottom plate.

In one embodiment, the bent support portion extends from a bottom portion of the first or second end plate generally towards the battery cells and the bottom plate connects the first and second end plates to each other and is located between the first and second plates. Additionally, the first or second end plate may have a first fastening hole on a portion that contacts an end of the bottom plate, and wherein the bottom plate has a second fastening hole that is generally aligned with the first fastening hole. In one embodiment, the first and second fastening holes accommodate a fixing member.

In one embodiment, the first or second end plate includes a base plate contacting a peripheral one of the battery cells and at least one flange portion bent away from the battery cells from at least one of a side portion or a bottom portion of the base plate. Further, in one embodiment, the bottom plate contacts the base plates of the first and second end plates and is mounted on the bent support portions of at least one of the first end plate or the second end plate. The bent support portion may further include a third fastening hole through which a fastener extends to fix the bottom plate to the bent support portion.

In one embodiment, the flange portions comprise at least two lower flange portions spaced from each other on the base plate, and wherein the bent support portion is located between the flange portions. A width of the bent support portion may be substantially identical to the base plate and at least a portion of the flange portion may be coupled to an end of the side plate.

As described above, according to embodiments of the present invention, it is possible to provide a battery module including a housing capable of firmly fixing a plurality of battery cells.

Also, it is possible to provide a battery module capable of reducing the size and weight of the battery module by effectively distributing the load of a plurality of battery cells.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described with reference to the accompanying drawings.

An exemplary embodiment of the present invention will be described with reference to FIGS. 1 to 3B.

Figure 1:
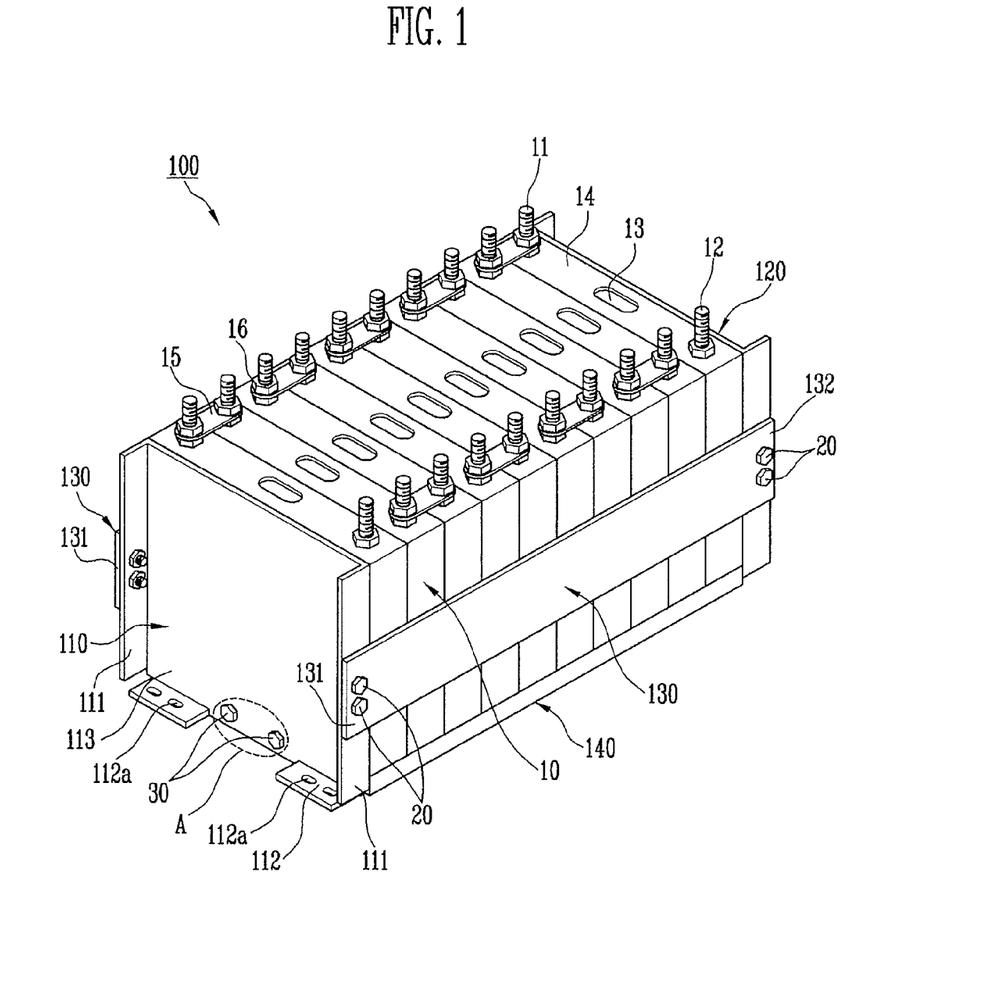
FIG. 1 is a perspective view of a battery module according to an embodiment of the present invention.
Figure 2:
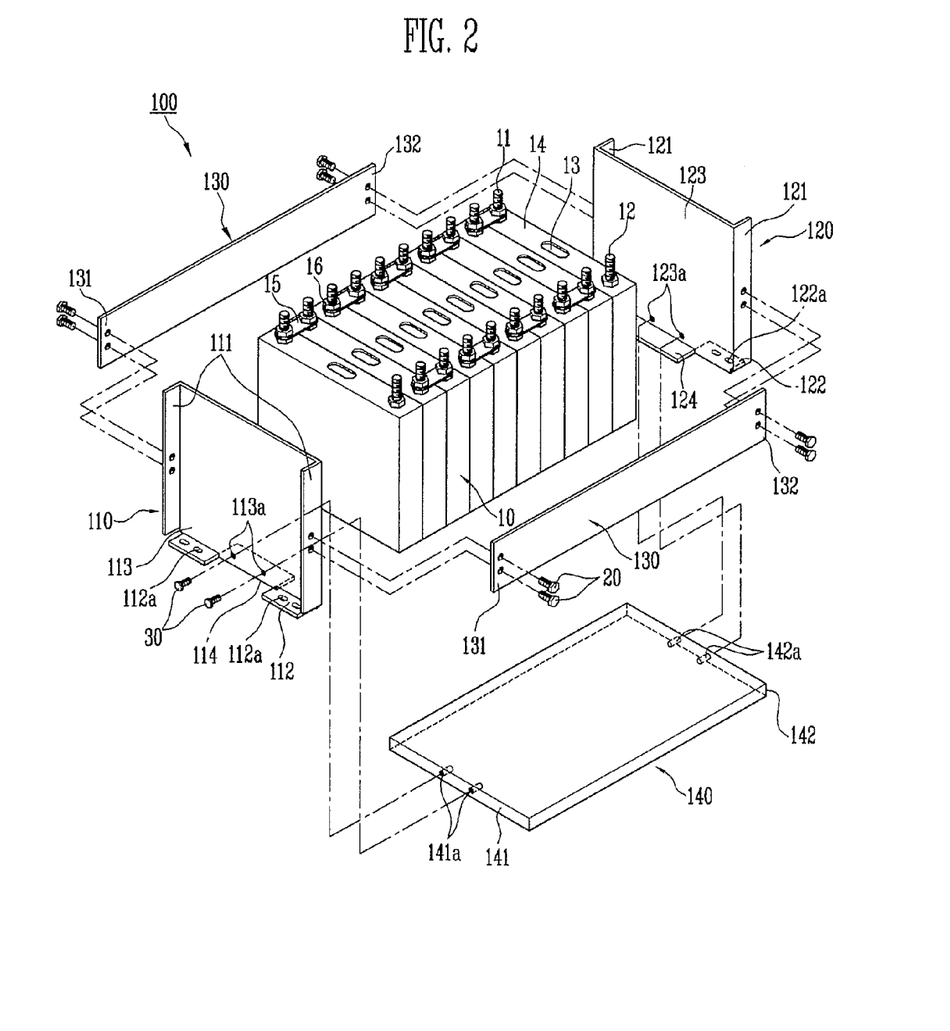
FIG. 2 is an exploded perspective view of FIG. 1.

FIG. 1 is a perspective view of a battery module according to an embodiment of the present invention. FIG. 2 is an exploded perspective view of FIG. 1.

The battery module 100 according to this embodiment includes a plurality of battery cells 10 stacked together and aligned in one direction, first and second end plates 110 and 120 located at either end of the stacked battery cells 10, and side and bottom plates 130 and 140 that connect the first and second end plates 110 and 120 and support both side surfaces of the battery cells 10. The first or second end plate 110 or 120 include bent support portions 114 and 124 that overlap at least a portion of the bottom plate 140.

The battery cell 10 may be manufactured by accommodating an electrode assembly and an electrolyte in a battery case and then sealing the battery case with a cap plate 14. The cap plate 14 may include positive and negative electrode terminals 11 and 12, and a vent 13 located between the terminals 11 and 12. The electrode assembly is composed of a positive electrode plate, a negative electrode plate and a separator between electrode plates. The positive electrode plate is connected to the positive electrode terminal 11, and the negative electrode plate is connected to the negative electrode terminal 12 so that energy generated by an electrochemical reaction between the electrode assembly and the electrolyte is transferred to the exterior of the battery cell 10. The vent 13 serves as a path along which gas generated in the interior of the battery cell 10 can be exhausted to the exterior of the battery cell 10.

The pair of the first and second end plates 110 and 120 and the side and bottom plates 130 and 140 that connect the first and second end plates 110 and 120 accommodate the plurality of battery cells 10. The battery cells 10 may be aligned and fixed in one direction within the provided space. In one embodiment, the battery cells 10 are aligned in parallel so that wide planar surfaces of neighboring battery cells 10 are opposite to each other. The positive and negative electrode terminals 11 and 12 may be electrically connected through bus-bars 15. The bus-bar 15 has openings through which the positive and negative electrode terminals 11 and 12 can pass. The bus-bar 15 connected to the terminals respectively passing through the holes may be fixed by a member including a nut 16 or the like.

The first and second end plates 110 and 120 are oriented to contact one of the outermost battery cells so that they can together apply a compressive force to the battery cells 10. In one embodiment, the positive and negative electrode terminals 11 and 12 of the plurality of battery cells 10 supported by the first and second end plates 110 and 120, the side plates 130 and the bottom plate 140 may be alternately aligned to be connected in series.

The first and second end plates 110 and 120, the side plates 130 and the bottom plate 140 constitute a housing for stably fixing the plurality of battery cells 10. The housing may be implemented by being variously modified according to the design target of the battery module 100.

In one embodiment, the first and second end plates 110 and 120 include respective base plates 113 and 123 and flange portions 111, 112, and 121, 122. The base plates 113 and 123 are oriented parallel to the battery cells 10, and the flange portions 111, 112, 121 and 122 may be provided to be bent to extend away from the battery cells 10 from at least one edge of the base plates 113 and 123.

The base plates 113 and 123 have a size similar to the wide front surface of the battery cell 10 so as to at least partially cover the external shape of the battery cell 10. In this embodiment, the base plates 113 and 123 may have an approximately rectangular shape generally corresponding to the battery cell 10. However, the present invention is not limited thereto.

Figure 3A:
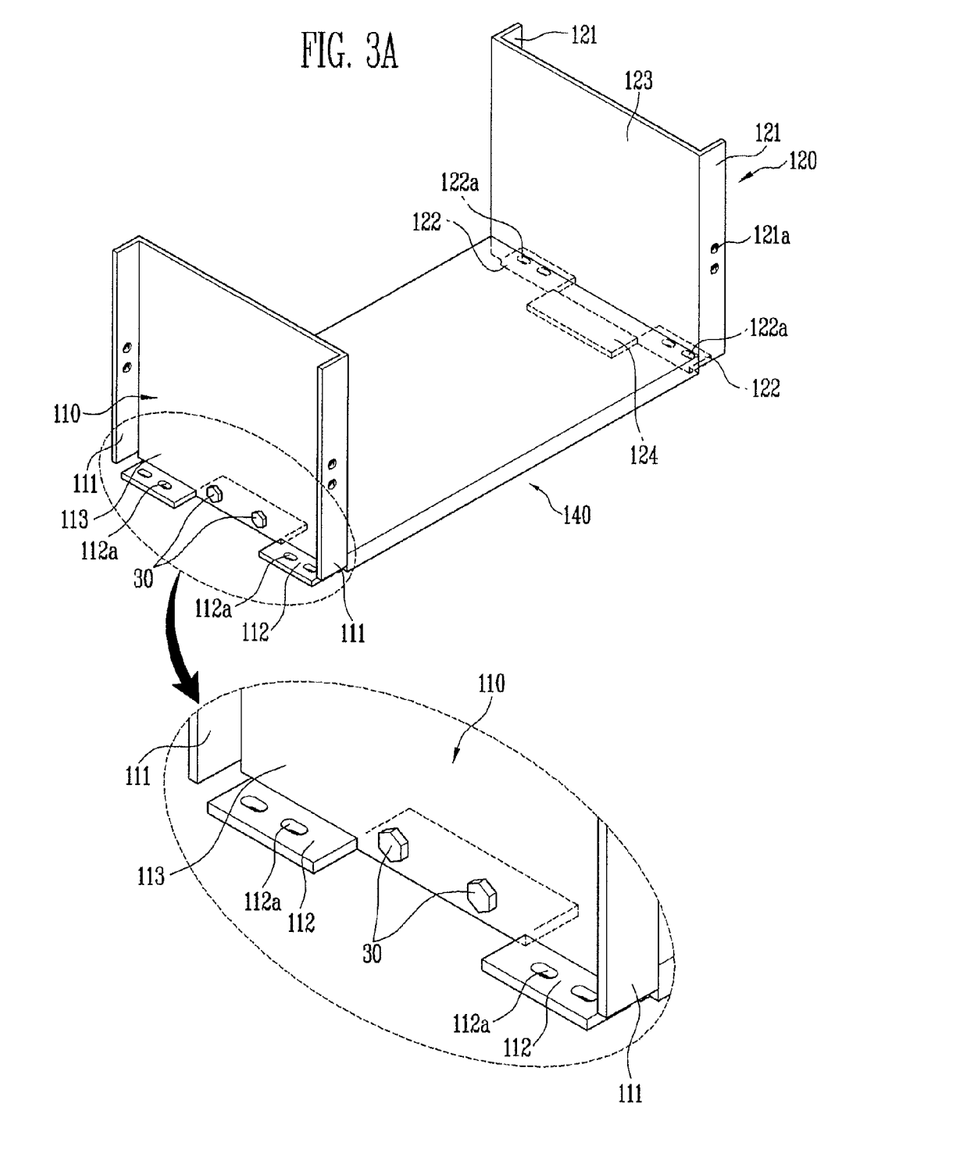
FIG. 3A is a perspective view showing end plates connected to a bottom plate.
Figure 3B:
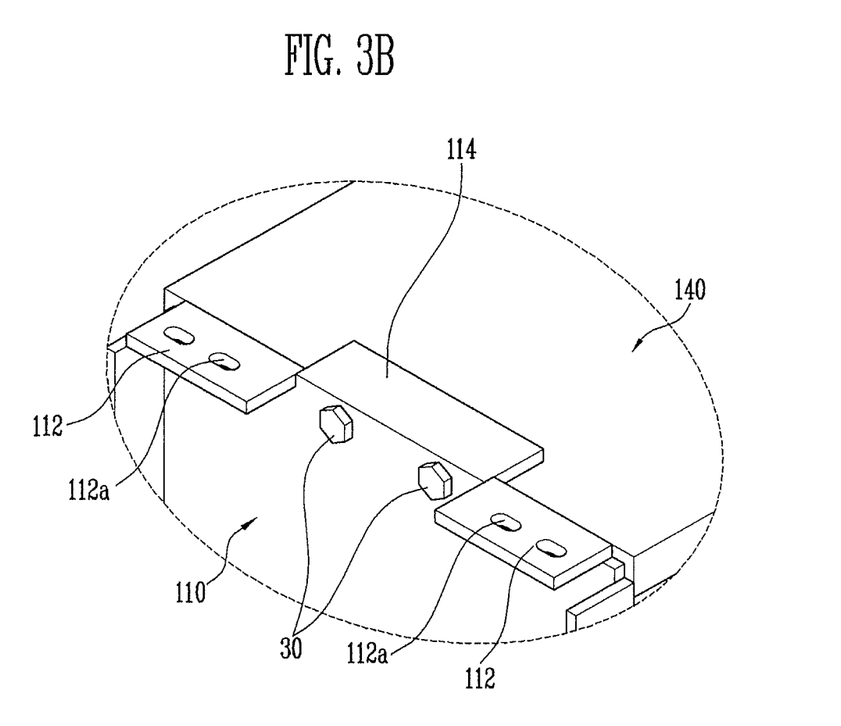
FIG. 3B is a bottom perspective view of a bottom portion of the battery module according to an embodiment of the present invention.

The flange portions 111, 112, and 121, 122 may include side flange portions 111 and 121 extending from the side portions of the base plates 113 and 123, respectively, and bottom flange portions 112 and 122 extending from the bottom portions of the base plates 113 and 123, respectively. The side flange portions 111 and 121 are portions respectively coupled to ends 131, 132 of the side plate 130. The coupling force between the side plate 130 and the side flange portions 111 and 121 can be enhanced using bolts 20 or the like FIG. 3A is a perspective view showing a state that the end plates are connected to the bottom plate. FIG. 3B is a bottom perspective view of a bottom portion of the battery module according to the embodiment of the present invention.

Referring to FIGS. 3A and 3B, the first or second end plate 110 or 120 may include the bent support portions 114 and 124 that overlap with at least portions of the bottom plate 140. The bottom plate 140 connects the first and second end plates 110 and 120 to each other and is provided between the first and second end plates 110 and 120. Each end 141 and 142 of the bottom plate 140 contacts the base plates 113 and 123 of the first and second end plates 110 and 120, respectively.

In the first and second end plates 110 and 120, the flange portions 111, 112, 121 and 122 may include at least two lower flange portions 112 and 122, respectively, spaced from each other at the bottom portions of the base plates 113 and 123. The bent support portions 114 and 124 may be provided between the lower flange portions 112 and 122. The bent support portions 114 and 124 may be provided so that each of the bent support portions extends from the bottom portion of the first or second end plate 110 or 120 toward the battery cells 10.

One or more holes 112a and 122a may be provided to the respective lower flange portions 112 and 122 for mounting the battery module 10 on a flat part or to fix between neighboring battery modules.

Since the bottom plate 140 supports the load of the plurality battery cells 10, it typically has a higher rigidity than the side plates 130 or the first and second end plates 110 and 120. The fastening force between the bottom plate 140 and the first and second end plates 110 and 120 is sufficient to support the load of the plurality of the battery cells 10.

In this embodiment, the bent support portions 114 and 124 are provided on the respective first and second end plates 110 and 120 so that the bottom plate 140 can distribute the load of the battery cells 10 concentrated on the bottom plate 140 to the first and second end plates 110 and 120. Since stress applied to portions at which the first and second end plates 110 and 120 are fastened to the bottom plate 140 can be distributed, it is possible to improve the stability of the battery module 100 against an external impact such as a vibration or impact.

Generally, the bottom plate 140 is made of a material such as SUS with high rigidity to support the load concentrated on the bottom plate 140. However, the battery module 100 according to this embodiment is not limited thereto. For example, in the battery module 100 according to this embodiment, the bottom plate 140 may be made of plastic or the like, which has relatively low rigidity. The bottom plate 140 made of a plastic resin material has a lower rigidity than the SUS or the like, but minimizes the weight and size of the battery module and has plasticity, and thus the design of the battery module can be more easily modified. Further, the plastic resin bottom plate 140 has excellent insulation properties, and thus the stability of the battery module can be improved.

The bottom plate 140 may be provided to contact the base plates 113 and 123 of the first and second end plates 110 and 120 and to be mounted on the bent support portions 114 and 124 of the first and second plates 110 and 120. The first or second end plate 110 or 120 is provided with a first fastening hole 113a or 123a at a portion that contacts the one or the other end 141 or 142 of the bottom plate 140. The bottom plate 140 may have a second fastening hole 141a or 142a generally corresponding to the first fastening hole 113a or 123.

The first and second fastening holes 113a, 123a, 141a and 142a are provided so that corresponding first and second fastening holes are aligned with each other. The first and second fastening holes 113a, 123a, 141a and 142a 30 receive fixing members 30 to improve the fastening force between the bottom plate 140 and the first and second end plates 110 and 120. For example, the fixing member 30 may include a bolt or stud.

Since the first and second fastening holes 113a, 123a, 141a and 142a are fastened to be generally perpendicular to the load of the battery cells 10 which is concentrated on the bottom plate 140, the load of the battery cells 10 can be distributed.

Hereinafter, another embodiment of the present invention will be described with reference to FIGS. 4A to 6B. In this embodiment, details except the following description are similar to those described in FIGS. 1 to 3B, and therefore, their detailed descriptions will be omitted.

Figure 4A:
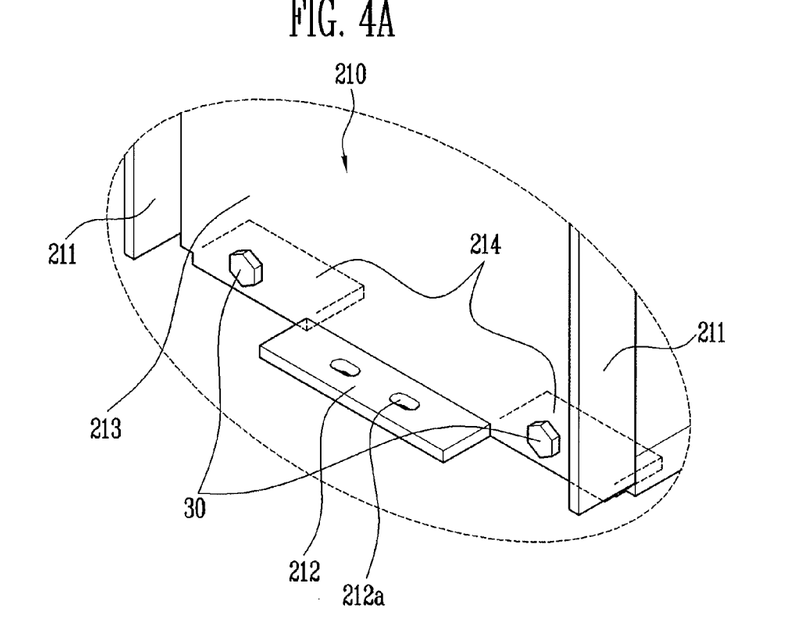
FIG. 4A is a perspective view of a first end plate and a bottom plate according to another embodiment of the present invention.
Figure 4B:
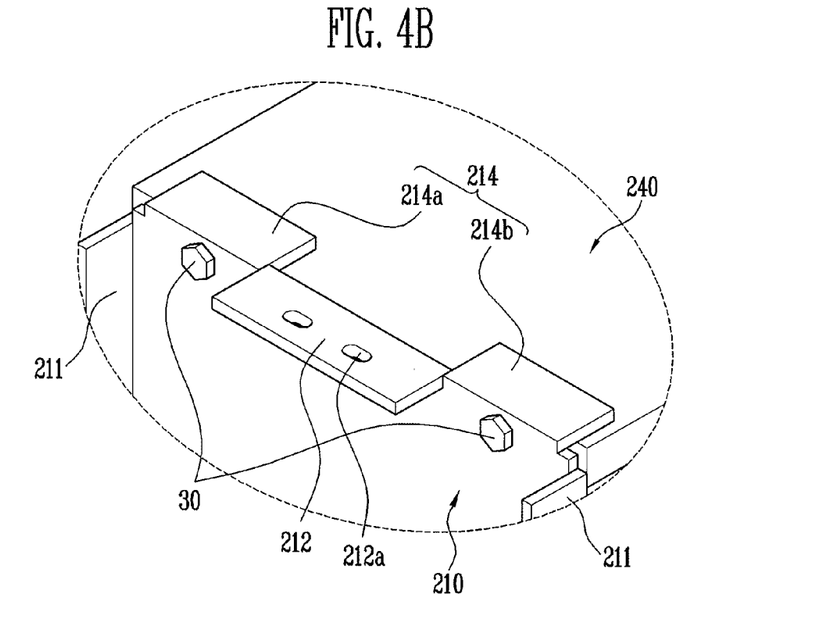
FIG. 4B is a bottom perspective view of a bottom portion of FIG. 4A.

FIG. 4A is a perspective view of a first end plate and a bottom plate according to another embodiment of the present invention. FIG. 4B is a perspective view of a bottom portion of FIG. 4A.

Referring to FIGS. 4A and 4B, in a battery module according to this embodiment, the bottom plate 240 may be provided to contact a base plate 213 of the first end plate 210 and to be mounted on a bent support portion 214 of the first end plate 210.

The first end plate 210 includes at least one lower flange portion 212 bent away from the battery cells from a bottom portion of the base plate 213. The bent support portion 214 may include one or more bent support portions 214a and 214b spaced from each other. In one embodiment, the lower flange portion 212 may be provided at a central portion of the base plate 213 between the bent support portions 214a and 214b.

In this embodiment, the first end plate 210 includes the one or more bent support portions 214a and 214b, and therefore, the area overlapping with the bottom plate 240 is maximized. Thus, the load of the battery cells which is concentrated on the bottom plate 240 can be more effectively distributed, thereby stably supporting the battery cells.

Figure 5A:
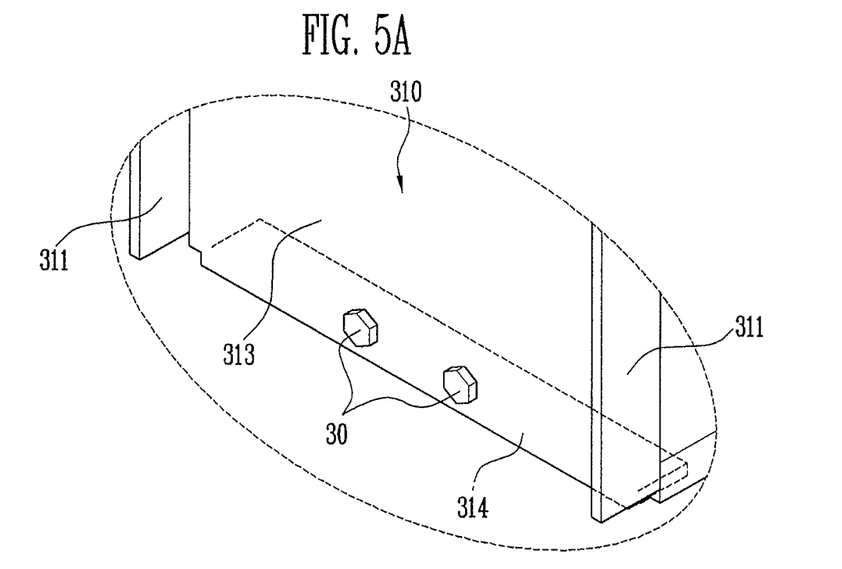
FIG. 5A is a perspective view of a first end plate and a bottom plate according to still another embodiment of the present invention.
Figure 5B:
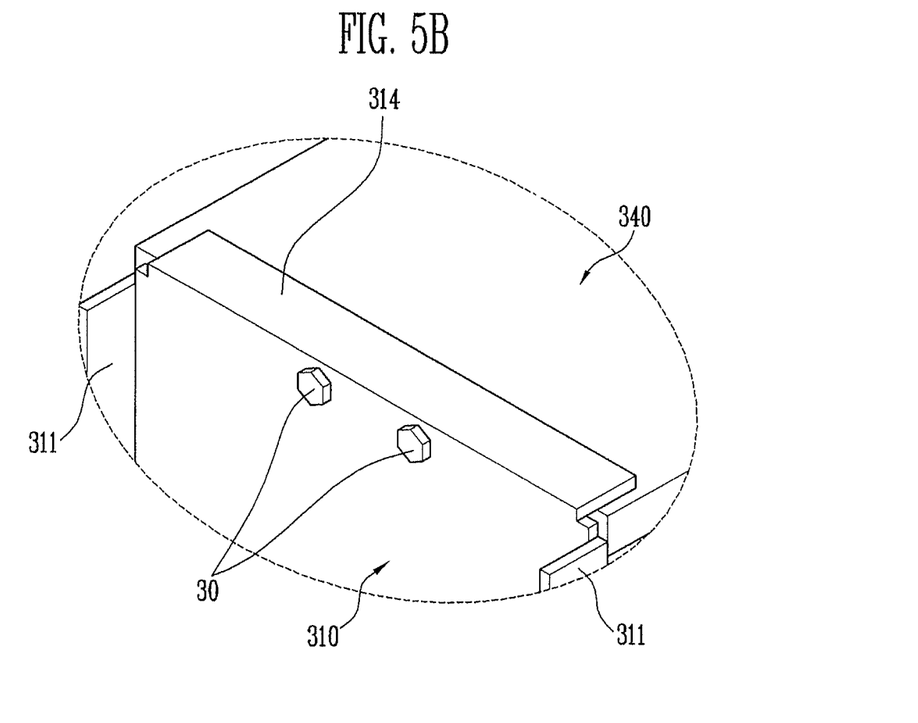
FIG. 5B is a bottom perspective view of a bottom portion of FIG. 5A.

FIG. 5A is a perspective view of a first end plate and a bottom plate according to still another embodiment of the present invention. FIG. 5B is a perspective view of a bottom portion of FIG. 5A.

Referring to FIGS. 5A and 5B, in a battery module according to this embodiment, the bottom plate 340 may be provided to contact a base plate 313 of the first end plate 310 and to be mounted on a bent support portion 314 of the first end plate 310. In this instance, the width of the bent support portion 314 may be substantially identical to the base plate 313.

In the battery module that requires no lower flange portion of the first end plate 310, the width of the bent support portion 314 is substantially identical to the base plate 313 so that it is possible to effectively distribute a load applied to the bottom plate 340 without a change in the size of the battery module. The bent support portion 314 is provided only by bending a bottom portion of the base plate 313 without an additional cutting process so that it is possible to improve process efficiency.

Figure 6A:
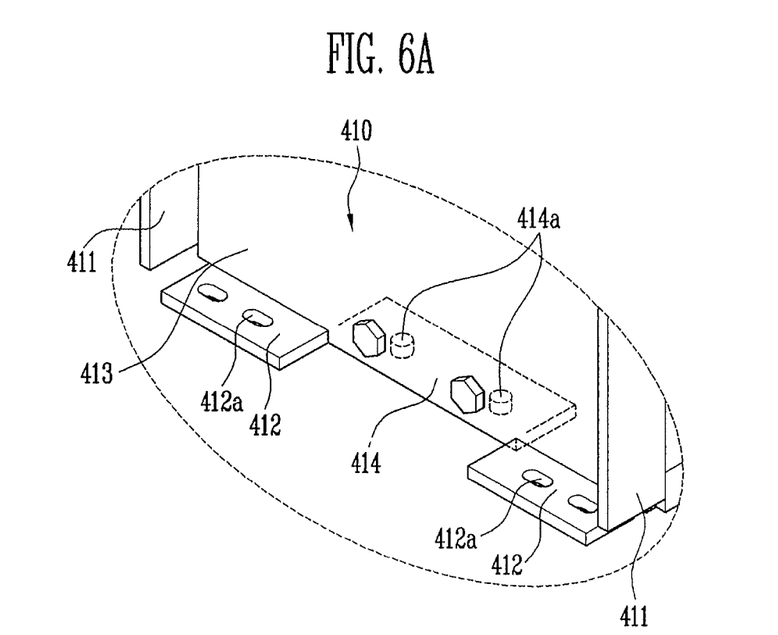
FIG. 6A is a perspective view of a first end plate and a bottom plate according to still another embodiment of the present invention.
Figure 6B:
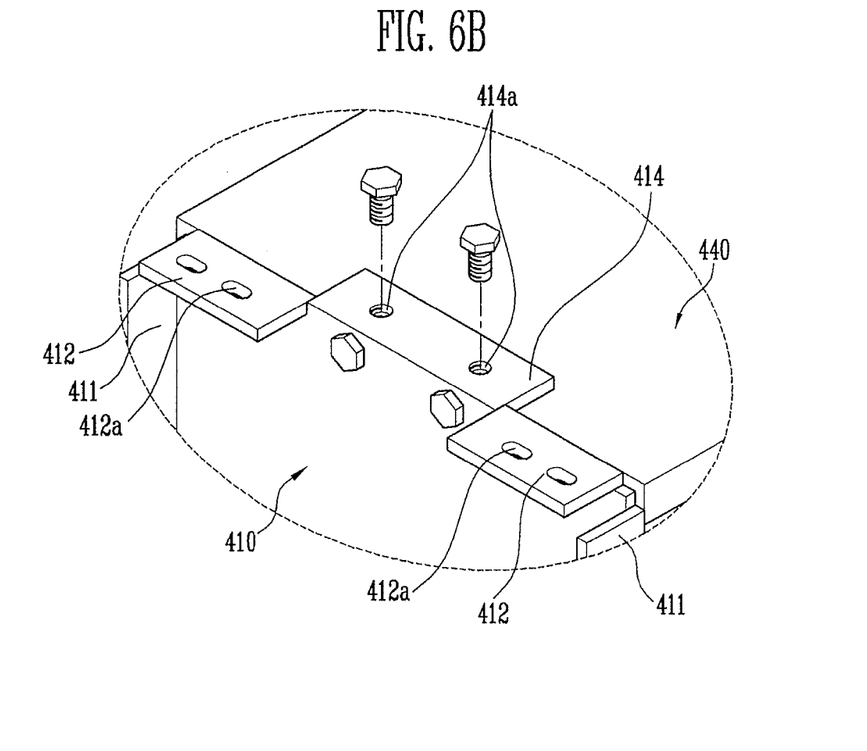
FIG. 6B is a bottom perspective view of a bottom portion of FIG. 6A.

FIG. 6A is a perspective view of a first end plate and a bottom plate according to still another embodiment of the present invention. FIG. 6B is a perspective view of a bottom portion of FIG. 6A.

Referring to FIGS. 6A and 6B, in a battery module according to this embodiment, the bottom plate 440 may be provided to contact a base plate 413 of the first end plate 410 and to be mounted on a bent support portion 414 of the first end plate 410. In this embodiment, the bent support portion 414 may further include third fastening holes 414a through which the bottom plate 440 is fixed to the bent support portion 414 of the first end plate 410.

In the battery module according to this embodiment, the bottom plate 440 is fastened to the base plate 413 of the first end plate 410, and a fastening portion of the bottom plate 440 is increased by the third fastening holes 414a provided to the bent support portion 414 so that it is possible to improve the fastening force between the first bottom plate 440 and the first end plate 410.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells stacked together;
   first and second end plates located at a first end and a second end, respectively, of the stacked battery cells; and
   side plates and a bottom plate coupled to the first and second end plates, wherein the bottom plate has a substantially planar surface and extends across substantially an entire width of the battery cells;
   wherein at least one of the first end plate and the second end plate has a bent support portion extending in a first direction and having a substantially planar surface, wherein the substantially planar surface directly contacts and overlaps with at least a portion of the substantially planar surface of the bottom plate and a flange extending in a second direction substantially opposite to the first direction.

2. The battery module according to claim 1, wherein the bent support portion extends from a bottom portion of the first or second end plate generally towards the battery cells.

3. The battery module according to claim 1, wherein the bottom plate connects the first and second end plates to each other and is located between the first and second plates.

4. The battery module according to claim 3, wherein the first or second end plate has a first fastening hole on a portion that contacts an end of the bottom plate, and wherein the bottom plate has a second fastening hole that is generally aligned with the first fastening hole.

5. The battery module according to claim 4, wherein the first and second fastening holes accommodate a fixing member.

6. The battery module according to claim 5, wherein the fixing member comprises a bolt or a stud.

7. The battery module according to claim 1, wherein the bottom plate comprises plastic resin.

8. The battery module according to claim 1, wherein the first or second end plate comprises a base plate contacting a peripheral one of the battery cells and wherein the flange extends from at least one of a side portion or a bottom portion of the base plate.

9. The battery module according to claim 8, wherein the bottom plate contacts the base plate and is mounted on the bent support portions of at least one of the first end plate or the second end plate.

10. The battery module according to claim 9, wherein the bent support portion further comprises a third fastening hole through which a fastener extends to fix the bottom plate to the bent support portion.

11. The battery module according to claim 8, wherein the flange comprises at least two lower flange portions spaced from each other on the base plate, and wherein the bent support portion is located between the flange portions.

12. The battery module according to claim 8, wherein a width of the bent support portion is substantially identical to the base plate.

13. The battery module according to claim 8, wherein at least a portion of the flange is coupled to an end of the side plate.

* * * * *